United States Patent [19]

Karel et al.

[11] Patent Number: 4,470,193
[45] Date of Patent: Sep. 11, 1984

[54] METHOD OF MANUFACTURE OF ELECTRIC FUSION PIPE FITTINGS

[75] Inventors: Soumar Karel, Ashfield; Earl Erling, Oatley, both of Australia

[73] Assignee: Esdan Pty. Ltd., Rockdale, Australia

[21] Appl. No.: 371,297

[22] PCT Filed: Aug. 18, 1981

[86] PCT No.: PCT/AU81/00116
§ 371 Date: Apr. 9, 1982
§ 102(e) Date: Apr. 9, 1982

[87] PCT Pub. No.: WO82/00699
PCT Pub. Date: Mar. 4, 1982

[30] Foreign Application Priority Data

Aug. 22, 1980 [AU] Australia .............................. PE5207

[51] Int. Cl.³ .............................................. H05B 3/00
[52] U.S. Cl. ...................................... 29/611; 29/33 T; 29/450; 29/456; 29/525; 156/257; 219/544; 285/21
[58] Field of Search ................. 29/450, 611, 456, 525, 29/33 K, 33 T, 566.1; 242/7.02, 7.22; 138/133, 174; 285/21; 264/127; 156/169, 257; 219/544

[56] References Cited

U.S. PATENT DOCUMENTS

| 2,199,113 | 4/1940 | Peirce .................................... 29/456 |
| 2,424,974 | 8/1947 | Erb .................................. 29/456 X |
| 2,917,820 | 12/1959 | Matheny .......................... 29/456 X |
| 3,062,940 | 11/1962 | Bauer et al. ......................... 219/544 |
| 3,543,805 | 12/1970 | Matthews ....................... 138/133 X |
| 3,943,334 | 3/1976 | Sturm ................................ 285/21 X |
| 3,973,596 | 8/1976 | Walker ............................... 138/174 |
| 3,987,276 | 10/1976 | Vogelsanger et al. ............... 264/27 |
| 4,147,926 | 4/1979 | Stahli ............................. 219/544 X |
| 4,176,274 | 11/1979 | Lippera ........................... 219/544 X |
| 4,270,254 | 6/1981 | Bergloff et al. ................. 29/456 X |

FOREIGN PATENT DOCUMENTS

| 2848382 | 3/1980 | Fed. Rep. of Germany . |
| 1440713 | 6/1976 | United Kingdom . |
| 2036225 | 6/1980 | United Kingdom . |
| 2036518 | 6/1980 | United Kingdom . |

Primary Examiner—Charlie T. Moon
Attorney, Agent, or Firm—Charles E. Pfund

[57] ABSTRACT

Electric fusion pipe fittings for use in connecting plastics pipes may be manufactured by forming a groove (6) in a surface (2) of a filling (1) and laying a wire (8) in groove (6). Preferably groove (6) is formed by incision and the wire layed by groove cutting tool (4).

9 Claims, 2 Drawing Figures

METHOD OF MANUFACTURE OF ELECTRIC FUSION PIPE FITTINGS

TECHNICAL FIELD

This invention relates to a method for manufacture of a pipe fitting suitable for union with a plastics pipe by electric fusion.

BACKGROUND ART

Pipes for use for example as gas and water mains are commonly made by extrusion of plastics material such as nylon, high density polyethylene, polypropylene or polyvinyl chloride.

Much attention has been directed to improving methods for connecting together plastic pipes and particularly to methods enabling connection of such pipes after a major portion of one of them has been buried in the ground, as occurs for example during the installation of a new mains pipeline or replacement of a section of an existing pipeline. Attention has also been directed at reducing the level of skill required to make such connection.

One method of connecting such pipes involves the use of fittings known variously as "electric fusion fittings" or "electric welding fittings".

A typical electric fusion fitting comprises an injection moulded pipe collar the inside diameter of which is sized to sleeve the end portion of each of two pipes to be joined together. The collar is made of substantially the same plastics as the pipes and has a helix of wire moulded integrally therewith, the wire helix being coaxial with the collar and disposed at the inner surface of the collar or embedded within the collar adjacent the inner surface.

In use, one pipe end portion is inserted into the collar from one collar end and another pipe end portion is inserted into the collar from the other collar end so that the two pipes are substantially in abutment and sleeved at their respective end portions by the collar. The wire helix of the collar is thus disposed substantially at the interface between the collar inner surface and the outer surface of the respective pipe end portions. The wire helix is connectable, typically via terminal means moulded into the collar, to an electric welding circuit which provides a pulse of electric current of predetermined characteristics through the wire coil thereby heating the coil and causing fusion of the plastics material adjacent the helix surfaces, that is to say, causing the plastics of the collar to fuse with the plastics of the respective pipe end portions.

The result is that the pipe end portions are welded or fused together with the collar.

In the past electric fusion fittings have been manufactured by winding wire as a helix onto a mandrel and then forming the plastics collar around the coil and mandrel by injection moulding of the plastics.

A separate mould has thus been needed for each size and shape of fitting. As a result the cost of fusion fittings has been so high as to inhibit their widespread use, despite acknowledged advantages of the effectiveness and simplicity of that method for pipe jointing.

An objective of the present invention is to provide a method of manufacture of electric fusion pipe fittings which avoids the need for injection moulding about a wire helix and which in preferred embodiments would enable such fittings to be manufactured at lower cost than when manufactured in accordance with prior art methods.

DISCLOSURE OF THE INVENTION

According to one aspect the invention consists in a method of manufacture of an electric fusion pipe fitting comprising the steps of:
  forming a circumferential helical groove in a tubular surface of a plastics pipe fitting, and
  laying a wire in the groove.

According to a second aspect the invention consists in a method according to the first aspect wherein said step of forming is performed by incision.

In a preferred embodiment the groove is incised by a cutting tool and the wire is pressed into the groove by guide means adapted to follow the cutting tool.

BRIEF DESCRIPTION OF DRAWINGS

These and other aspects of the invention will now be further described, by way of example only, with reference to the accompanying drawings in which.

MODES OF CARRYING THE INVENTION INTO EFFECT

Figure 1:
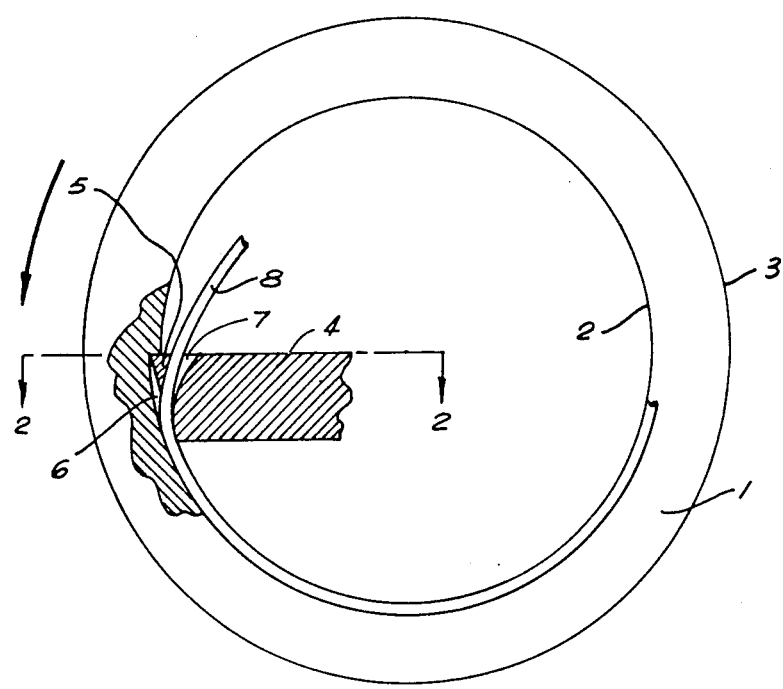
FIG. 1 is a schematic drawing of the cross section of a pipe fitting during manufacture by the method of the invention.

With reference to FIG. 1 there is shown in cross section a tubular pipe fitting shell 1 made from an extruded plastics for example polypropylene, and having an inner surface 2 and an outer surface 3. The pipe fitting in the present example has an internal diameter of approx. 90 mm and a wall thickness of 12–13 mm.

Fitting 1 is rotated about its tubular axis by lathe means (not illustrated) in the direction indicated by the arrow.

Figure 2:
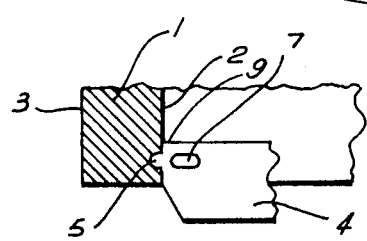
FIG. 2 is a view in the tangential direction, of the leading face of the cutting tool shown in FIG. 1.

A cutting tool a portion of which is indicated generally at 4 and shown in FIG. 2 from a view tangential to surface 2 and upstream from the tip 5 of tool 4, is adapted by means of incising tip 5 for cutting a groove 6 into surface 2 of the fitting. Wire guide means, comprising an orifice 7 located radially inwards of incising tip 5 are provided, whereby a wire 8 may be fed into the groove immediately downstream of incising tip 5.

Tool 4 is traversed in the fitting axial direction so that groove 6 incised by tip 5 is helical with a pitch for example of 1.75 mm.

Tool 4 is adapted to incise groove 6 with a depth at least equal to the radius of wire 8 and preferably of a depth substantially corresponding to the wire diameter. The width of groove 6 in the fitting axial direction is slightly less than the wire diameter. In the present example wire 8 is an enamel insulated copper wire of diameter approximately 0.9 mm.

The trailing edge of tool 4 presses wire 8 into the groove, the wire then being held in the groove by elastic compression from the groove side walls.

It will be understood that if the groove has a lesser depth than the radius of the wire, the wire will not be adequately anchored in the groove. It is highly preferred that the groove be of a depth substantially equal to the diameter of the wire so that the wire helix is sheltered by the groove and not dislodged during sleeving of the fitting over a pipe end, greater groove depths may lead to difficulty in control of fusion adjacent the interface of pipe and fitting.

For preference tool 4 is shaped so that edge 9 simultaneously trues the internal diameter of fitting shell 1 and also so as to facilitate removal of swarf from cutting edges.

Means (not shown) may be provided on tool 4 to guide wire from a bobbin to guide means 7 and a roller or other means may be adapted to follow cutting tool 4 for laying of the wire in the groove. It will be understood that while it is preferred that the groove be incised, and that the wire be laid therein, by one tool, in other embodiments those steps may be accomplished by different tools or in separate operations.

After laying of the wire in the groove, ends of the wire helix so formed may be provided with terminal connection to terminals outside the fitting by any suitable means or may simply be brought to outside the fitting for example through radial holes through the fitting wall spaced apart in the axial direction.

In a preferred embodiment of the invention a double helix groove is incised and a loop of wire is laid in the groove to form a double helix coil so that the coil wire ends are both disposed adjacent one end of the fitting. This method is especially suited for the laying of the wire in elbow fittings, T-fittings and the like.

The wire double helix may be laid for example by use of a cutting tool similar to that previously described but having two incising tips and two wire guide means.

It will be understood that the fitting may be held stationary and the incision of the groove may be concluded exclusively by rotation and translation of the cutting tool. The method may be applied to fittings of a very wide range of diameters and wall thicknesses and to fittings of a variety of shapes including elbows and junctions. In the latter cases separate coils may be inserted by the method described each in a different branch of the fitting.

Desirably the wire of the coil is an insulated wire for example an enamel or plastic insulated wire. The electrical resistance, diameter, length and like parameters of the wire are chosen in accordance with usual practice having regard to welding circuit equipment commonly used with such fittings, temperature of welding and time of welding desired. As will be apparent to those skilled in the art, although the invention has been described herein with reference to a wire helix lodged in a groove incised on the inner surface of the fitting, the groove could also be incised and the helix laid therein on the outer surface for example of a male fitting. Similarly, and within the scope of the invention the helix could be laid in a groove on the outer or inner surface of a pipe end, for example, an extruded pipe, and used for fusion with an ordinary fitting such as a plastic muff coupling or another pipe.

Preferred embodiments of the method of the invention have the advantage that simple fittings may be made by extrusion of the fitting shell, although complex fittings may require moulding of the shell. In either case electric fusion fittings of a wide range of sizes and shapes may be made using comparatively simple appratus and without need for expensive retooling to provide fusion means to shells when additional shapes or sizes are required.

THE CLAIMS DEFINING THE INVENTION ARE AS FOLLOWS:

We claim:

1. A method of manufacture of an electric fusion pipe fitting comprising the steps of:
   cutting a continuous helical groove in a tubular inner surface of a plastic pipe fitting with a cutting tool, and
   simultaneously laying by press-fitting a continuous metal electrical wire in the groove with a portion of the cutting tool.

2. A method according to claim 1 wherein said groove has a depth equal to or greater than the radius of said wire.

3. A method according to claim 2 wherein said groove has a width less than the wire diameter whereby the wire is restrained from leaving the groove by compressive forces applied by the groove side walls.

4. A method according to claim 3 wherein said compressive forces are elastic.

5. A method according to claim 2 wherein said groove is of a depth substantially equal to or greater than the diameter of said wire.

6. The method of manufacture of an electrical fusion plastic pipe fitting comprising, with the aid of a cutting tool supported adjacent the inner surface of the cylindrical inner surface of the fitting and movable longitudinally thereof, cutting a helical groove in said surface by rotating the fitting relative to the tool and with the aid of said cutting tool, simultaneously press-fitting a continuous metal electrical wire into the groove as it is formed.

7. The method according to claim 6 wherein the tool has a cutting tip configured to form the groove and an orifice adjacent the cutting edge for receiving and guiding the wire into the groove.

8. The method according to claim 7 wherein the orifice is located radially inward of the tip such as to enable feeding the wire into the groove immediately downstream of the tip.

9. The method according to claim 6 wherein the trailing edge of the tool presses the wire into the groove.

* * * * *